(12) United States Patent
Weih et al.

(10) Patent No.: US 12,173,890 B2
(45) Date of Patent: Dec. 24, 2024

(54) SHAPED PART AND METHOD FOR PRODUCING A SHAPED PART

(71) Applicant: Novem Car Interior Design GmbH, Vorbach (DE)

(72) Inventors: Philipp Weih, Haag (DE); Andreas Karl, Speinshart (DE)

(73) Assignee: NOVEM CAR INTERIOR DESIGN GMBH, Vorbach (DE)

( * ) Notice: Subject to any disclaimer, the term of this patent is extended or adjusted under 35 U.S.C. 154(b) by 0 days.

(21) Appl. No.: 18/576,333

(22) PCT Filed: Jul. 8, 2022

(86) PCT No.: PCT/EP2022/069089
§ 371 (c)(1),
(2) Date: Jan. 3, 2024

(87) PCT Pub. No.: WO2023/281065
PCT Pub. Date: Jan. 12, 2023

(65) Prior Publication Data
US 2024/0328593 A1   Oct. 3, 2024

(30) Foreign Application Priority Data
Jul. 8, 2021   (DE) .......................... 102021117673.5

(51) Int. Cl.
*B60Q 3/54* (2017.01)
*B32B 3/08* (2006.01)
(Continued)

(52) U.S. Cl.
CPC .............. *F21V 5/007* (2013.01); *B32B 3/085* (2013.01); *B32B 3/266* (2013.01); *B32B 3/30* (2013.01);
(Continued)

(58) Field of Classification Search
CPC ...... B60Q 1/5035; B60Q 3/54; B60Q 1/2696; B60K 35/22
See application file for complete search history.

(56) References Cited

U.S. PATENT DOCUMENTS

2020/0207261 A1* 7/2020 Camras ................. H05B 45/20
2021/0191145 A1* 6/2021 Schrama ................. G09G 3/32

FOREIGN PATENT DOCUMENTS

DE   102007054348 B4   5/2009
DE   102012101315 A1   8/2013
(Continued)

OTHER PUBLICATIONS

International Search Report for PCT App. PCT/EP2022/069089 mailed Nov. 14, 2022.
(Continued)

*Primary Examiner* — William J Carter
(74) *Attorney, Agent, or Firm* — Workman Nydegger

(57) ABSTRACT

A shaped part comprising a decorative layer having a front/visible side, a rear/opposite side and a micro-perforation (plurality of through holes), The holes each extend in a straight line between the rear side and the front side. An optical system enables an indicator unit comprising a display on the rear side to be visibly displayed through the micro-perforation of the shaped part. The display is a microLED display, the pixels of which are formed by microLEDs, and the optical system is a micro-optical system having micro-structures, wherein each micro-structure extends from the rear side of the decorative layer into a hole associated therewith in the micro-perforation in the decorative layer. Each micro-structure is associated with a microLED and is arranged and designed such that it guides the light emanat-
(Continued)

ing from the microLED associated therewith through the hole associated therewith to the front side of the decorative layer.

15 Claims, 1 Drawing Sheet

(51) Int. Cl.
*B32B 3/26* (2006.01)
*B32B 3/30* (2006.01)
*B32B 5/02* (2006.01)
*B32B 7/12* (2006.01)
*B32B 21/08* (2006.01)
*B32B 21/10* (2006.01)
*B32B 21/14* (2006.01)
*B32B 27/36* (2006.01)
*B32B 27/40* (2006.01)
*F21V 5/00* (2018.01)
*F21V 8/00* (2006.01)
*F21W 106/00* (2018.01)
*F21Y 113/00* (2016.01)
*F21Y 115/10* (2016.01)

(52) U.S. Cl.
CPC .............. *B32B 5/022* (2013.01); *B32B 7/12* (2013.01); *B32B 21/08* (2013.01); *B32B 21/10* (2013.01); *B32B 21/14* (2013.01); *B32B 27/365* (2013.01); *B32B 27/40* (2013.01); *G02B 6/0006* (2013.01); *G02B 6/0008* (2013.01); *B32B 2255/08* (2013.01); *B32B 2255/26* (2013.01); *B32B 2307/41* (2013.01); *B32B 2307/412* (2013.01); *B32B 2307/414* (2013.01); *B32B 2457/00* (2013.01); *B32B 2605/003* (2013.01); *B60Q 3/54* (2017.02); *F21W 2106/00* (2018.01); *F21Y 2113/00* (2013.01); *F21Y 2115/10* (2016.08)

(56) References Cited

FOREIGN PATENT DOCUMENTS

| | | |
|---|---|---|
| DE | 202015106328 | 11/2016 |
| DE | 202017104082 | 7/2018 |
| DE | 102018106258 B3 | 8/2019 |
| DE | 102018106259 | 9/2019 |
| DE | 102019104205 | 9/2019 |
| DE | 102018130738 | 6/2020 |
| DE | 102019121917 | 2/2021 |
| DE | 102019127630 | 4/2021 |
| EP | 2060443 | 10/2009 |
| EP | 3573043 | 11/2019 |
| WO | WO-2020223036 A1 * | 11/2020 ............. B60K 37/02 |

OTHER PUBLICATIONS

International Preliminary Report on Patentability received for PCT Patent Application No. PCT/EP2022/069089, mailed on Jan. 18, 2024, 18 pages (9 pages of English Translation and 9 pages of Original Document).

International Search Report and Written Opinion received for PCT Patent Application No. PCT/EP2022/069089, mailed on Nov. 14, 2022, 22 pages (9 pages of English Translation and 12 pages of Original Document).

* cited by examiner

SHAPED PART AND METHOD FOR PRODUCING A SHAPED PART

CROSS-REFERENCE TO RELATED APPLICATIONS

The present invention is a 35 U.S.C. § 371 U.S. National Stage of PCT Application No. PCT/EP2022/069089, filed on Jul. 8, 2022, which claims priority to DE 102021117673.5, filed on Jul. 8, 2021. The entire content of each of the aforementioned patent applications is incorporated herein by reference.

BACKGROUND OF THE INVENTION

1. Field of the Invention

The invention relates to a shaped part, in particular a decorative part and/or panel part designed as a shaped part for a vehicle interior, and to a method for producing a shaped part.

2. The Relevant Technology

Shaped parts comprise a decorative layer having a front side designed as a visible side and a rear side opposite the front side. Numerous decorative and panel parts are installed in the vehicle interior, for example door panels, console panels, and instrument panels. The decorative and panel parts also include control buttons or the covers of control buttons.

It is desirable to achieve design surfaces that are as seamless and uniform as possible, which means that actuation functions and/or information functions and/or lighting functions or functional components required to achieve these functions, such as switches, buttons or displays, should only be visible when in use, i.e. in the active state. In order to achieve this, it is known to integrate such functions or functional components into the shaped parts in such a way that they are not visible when not in use, i.e. in the inactive state. As a result, the visible side of the decorative part appears to the observer as a seamless, continuous and uniform design surface when not in use.

For example, shaped parts are known, the decorative layer of which has a micro-perforation formed by a plurality of through holes. On the rear side of the decorative layer, a display is arranged in the region of the micro-perforation in such a way that visible light emanating from the display is guided from the rear side of the decorative layer through the holes to the front side of the decorative layer and an indication shown by the display is therefore visible on the visible side of the decorative layer of the shaped part.

There is a need to display the indications on the front side of the decorative layer with sufficient luminance, edge sharpness, and the desired color. This can be impaired, for example, by scattering the light emanating from the display within the holes at the interface to the decorative material of the decorative layer. In order to prevent or at least minimize this effect, it is known, for example, to fill the holes with a liquid, transparent or translucent material in order to guide the light emanating from the display in a targeted manner through the holes to the front side of the decorative layer (so-called "filler" method).

BRIEF SUMMARY OF THE INVENTION

The present invention is based on the object of specifying a new shaped part which meets the above-mentioned requirements and in particular allows efficient light guidance through the holes of the decorative layer. It is also an object of the invention to provide a new method for producing a shaped part.

This object is achieved in terms of the shaped part by the features of claim 1 and in terms of the method by the features of claim 8. Advantageous embodiments and developments are provided in each of the dependent claims.

The shaped part according to the invention comprises a decorative layer having a front side designed as a visible side, a rear side opposite the front side, and a micro-perforation formed by a plurality of through holes, wherein the holes each extend in a straight line along their respective longitudinal axis between the rear side and the front side of the decorative layer.

The shaped part according to the invention further comprises an indicator unit comprising a display arranged on the rear side of the decorative layer and an optical system by means of which an indication shown by the display is visible through the micro-perforation of the decorative layer on the visible side of the shaped part. The indication can be, for example, variable images or a constant symbol.

According to the invention, the display is a microLED display, the pixels of which are formed by microLEDs, and the optical system is a micro-optical system which has or comprises micro-structures or is formed by one or more optical micro-structures. Each micro-structure extends from the rear side of the decorative layer at least partially into a hole of the micro-perforation in the decorative layer associated therewith. Furthermore, each micro-structure is associated with a microLED and is arranged and designed such that it guides the light emanating from the microLED associated therewith through the hole associated therewith to the front side of the decorative layer. In other words, the micro-optical system, more precisely the micro-structures, are designed as light guides which guide the light emitted by the respective microLED to the visible side of the decorative layer.

Micro-perforation is understood to mean the presence of a plurality of through holes (or apertures) in the decorative layer. The material of the decorative layer is therefore removed in the region of the holes. The longitudinal axis of each hole through which visible light is guided toward the front side of the decorative layer can be oriented parallel and/or congruent or obliquely to a surface normal of the front side of the decorative layer at the exit point of the respective hole. Furthermore, the holes can in particular run parallel to one another. The cross section of the holes perpendicular to their respective longitudinal axis can be round or elliptical or angular. The cross-sectional dimensions of these holes are, for example, in the range from 50 to 150 µm, for example 90 µm. All of the holes can be evenly distributed over the micro-perforation region. In this case the hole density is constant. All holes can also have the same cross-sectional shape and the same dimensions. A circle, for example, comes into consideration as a cross-sectional shape. Thus, circular holes, for example, could be evenly distributed in the region of the micro-perforation of the decorative layer, The hole diameters are preferably selected in such a way that the holes on the visible side are not visible to an observer when viewed normally without aids and without backlighting, that is to say the observer only sees the uniform, continuous, seamless design. Only when the holes are backlit does an indication in the design become visible through an indication on the display. With a typical hole diameter in the range from 50 to 150 µm, the hole spacing is typically in the range from 60 to 160 µm. Such a micro-perforation thus has a resolution in the range from 423 to 159 dpi. With a hole spacing of 100 µm, the resolution is 254 dpi. Smaller hole diameters in the range below 50 µm, for example in the range from 10 to 50 µm, are also possible. In this case, the hole spacing can be between 12 and 60 µm, for example, and the resolution can be in the range from 2117 to 423 dpi.

The micro-perforation greatly increases or at least improves the reproduction of brightness and/or color locus or color representation by the display compared to decorative layers without micro-perforations. The micro-perforation also increases the edge sharpness of the indication displayed. Furthermore, due to the micro-perforation, the decorative surface is not visually affected; when the display is switched off, only the continuous decoration is visible to the observer.

The wording "a hole associated with the micro-structure" is understood to mean that precisely one micro-structure is inserted or introduced into each hole of the micro-perforation or precisely one micro-structure is arranged within each hole. The wording "a micro-structure associated with the microLED" is to be understood to mean that the light emanating from each microLED is guided via such a micro-structure forming a light guide through the hole associated with the micro-structure to the front side of the decorative layer. In other words, the number of holes corresponds to the number of micro-structures and the number of microLEDs.

The shaped part according to the invention therefore offers the particular advantage that light emanating from the display or emitted by the microLEDs is guided through the holes to the visible side of the shaped part by means of the micro-optical system or the optical micro-structures, without scattering effects occurring within the holes. As a result, an indication with excellent edge sharpness and luminance can be made visible or displayed on the visible side of the shaped part at an angular width. Furthermore, the color locus or the color representation remains unchanged.

The angular width of the visibility of the display is understood in particular to mean the region or angular range in which the display is visible to an observer who is looking onto the front side of the decorative layer. For example, the angular width can be approximately 90°. By guiding the light through the holes by means of the micro-optical system, this dependence on the viewing angle can be significantly reduced with the shaped part according to the invention, i.e. the angular width can be increased. The micro-structures therefore ensure extremely efficient light guidance.

A further essential advantage of the invention is in particular that the micro-structures are inserted or introduced into the holes as a solid material or solid component. An undesired swelling and/or an undesired change in color and/or any other undesired change of the decorative layer—as can occur when filling in liquid or low-viscosity material—is thus prevented.

An embodiment variant of the invention provides that the decorative layer is or comprises a wood veneer. However, the decorative layer can also comprise or consist of metal, for example aluminum, and/or carbon and/or stone and/or textile materials and/or fabric and/or plastics material, for example a plastic film.

The decorative layer can also consist not only of one decorative ply but also of two or more plies. For example, in addition to the decorative ply, which can be one of the aforementioned materials, the decorative layer can have an additional ply, for example a nonwoven for stabilizing the decorative layer and/or an opaque ply, and/or one or more adhesive plies. These additional plies and adhesive plies are then penetrated by the holes, just like the decorative ply.

According to an advantageous embodiment, each micro-structure extends along the longitudinal axis of the hole associated therewith, starting from the rear side of the decorative layer over the entire length of the hole and into the hole. This ensures that the visible light emanating from the display is guided up to the visible side of the shaped part and that no scattering effects occur within the holes even in a region near the front side of the decorative layer.

Furthermore, it is preferred that each micro-structure completely fills the hole associated therewith in a transverse direction running perpendicular to the longitudinal axis of the hole associated therewith, i.e. the cross section of the holes is completely filled.

It can preferably be provided that each micro-structure completely fills the hole associated therewith both along the longitudinal axis and in the transverse direction running perpendicular to the longitudinal axis, i.e. the cross section of the hole is completely filled.

The micro-structures can thus be designed in such a way that their shape and/or dimensions in a direction along the longitudinal axis and/or perpendicular thereto correspond, at least in portions, to the hole associated therewith in the region of the holes. In general, the micro-structures are dimensioned such that their length along the longitudinal axis is many times greater than their cross section perpendicular to the longitudinal axis. For example, the micro-structure can comprise a rod-shaped portion with a circular cross section, wherein the rod-shaped portion is arranged within the hole and completely fills it in the longitudinal direction and/or in the transverse direction.

According to a preferred embodiment variant, each of the micro-structures comprises a micro-lens which is formed or arranged on an end portion of the micro-structures facing the microLED, and via which the corresponding micro-structure is arranged on the microLED associated therewith or is placed or applied thereon. As a result, the light emitted by the microLED is concentrated and guided through the holes in a targeted manner by means of the micro-structures. The micro-lens is preferably formed in one piece with the respective micro-structure, i.e. as a part of this micro-structure. The micro-lens can be realized, for example, by a convexly designed end portion of a further rod-shaped micro-structure.

The micro-optical system, in particular the micro-structures, is preferably formed from a plastics material, in particular from a translucent or transparent plastics material, for example PMMA or polycarbonate, or comprises such a plastics material.

According to an advantageous embodiment, the indicator unit comprises a printed circuit board on which the microLEDs are arranged and/or fastened and/or electrically contacted.

Furthermore, it can be provided that the shaped part comprises a carrier arranged on the rear side of the decorative layer, wherein the carrier has a recess in a region of the holes in which the display is arranged. The carrier can consist of or comprise a plastics material, for example polyurethane PUR and/or polycarbonate PC. Furthermore, it can be provided that the carrier is injection-molded onto the rear side of the decorative layer. Alternatively, the carrier can be bonded or pressed onto the rear side of the decorative layer, in particular by means of the adhesive ply(ies).

A transparent or translucent protective and/or optical layer, in particular a transparent or translucent lacquer, can be arranged or applied to the front side of the decorative layer. The protective and/or optical layer can be designed to be open-pored or high-gloss. The protective and/or optical layer can, for example, be cast and/or injected and/or sprayed on. For example, the protective and/or optical layer comprises polyurethane ("PUR") or is formed from PUR.

The method according to the invention for producing a shaped part, in particular for producing a shaped part according to the invention, comprises the following steps:
a) providing a decorative material for forming the decorative layer,
b) introducing a plurality of through holes into the decorative material for forming a micro-perforation,
c) providing and/or producing an indicator unit comprising a display, wherein the display is a microLED display, the pixels of which are formed by microLEDs, and comprising an optical system, wherein the optical system is a micro-optical system having micro-structures,
d) assembling the indicator unit and decorative material by inserting or introducing the micro-structures into the holes of the micro-perforation from a rear side of the decorative material provided as a rear side of the decorative layer, and arranging the display on the rear side of the decorative material.

The decorative material may be or comprise a wood veneer. However, the decorative material can also comprise or consist of metal, for example aluminum, and/or carbon and/or stone and/or textile materials and/or fabric and/or plastics material, for example a plastic film.

The decorative material can consist only of one ply. However, the provided decorative material can also be a decorative material consisting of two or more plies. For example, in addition to a decorative ply, which can be one of the aforementioned materials, the decorative material can have an additional ply, for example a nonwoven for stabilizing the decorative layer and/or an opaque ply, and/or one or more adhesive plies.

The holes can be introduced into the decorative material to form the micro-perforation by lasering or fine cutting (also fine punching). If the decorative material has two or more plies, the holes are introduced through the entire decorative material, i.e. through all plies of the decorative material.

The holes are preferably introduced into the decorative layer in such a way that the longitudinal axis of each hole is arranged parallel and/or congruent and/or obliquely to a surface normal of the front side of the decorative layer at the exit point of the respective hole. Furthermore, the holes can in particular run parallel to one another.

The holes are preferably designed in such a way that the cross section of the holes is round or elliptical or angular perpendicular to their longitudinal axis.

The decorative material can be micro-perforated at least in regions, i.e. a micro-perforation formed by a plurality of holes is introduced into a region of the decorative material. The cross-sectional dimensions of these holes are, for example, in the range from 50 to 150 µm, for example 90 µm. All of the holes can be evenly distributed over the micro-perforation region. In this case the hole density is constant. All holes can also have the same cross-sectional shape and the same dimensions. A circle, for example, comes into consideration as a cross-sectional shape. Thus, circular holes, for example, could be evenly distributed in the region of the micro-perforation of the decorative layer. The hole diameters are preferably selected in such a way that the holes on the visible side are not visible to an observer when viewed normally without aids and without backlighting, that is to say the observer only sees the uniform, continuous, seamless design. Only when the holes are backlit does the interruption in the design become visible through an indication on the display. With a typical hole diameter in the range from 50 to 150 µm, the hole spacing is typically in the range from 60 to 160 µm. Such a micro-perforation thus has a resolution in the range from 423 to 159 dpi. With a hole spacing of 100 µm, the resolution is 254 dpi. Smaller hole diameters in the range below 50 µm, for example in the range from 10 to 50 µm, are also possible. In this case, the hole spacing can be between 12 and 60 µm, for example, and the resolution can be in the range from 2117 to 423 dpi.

According to an advantageous embodiment, the micro-structures are inserted or introduced into the holes along the respective longitudinal axis in such a way that each micro-structure extends along the longitudinal axis of the hole associated therewith, starting from the rear side of the decorative material over the entire length of the hole and into the hole, and/or in such a way that each micro-structure completely fills the hole associated therewith in a transverse direction running perpendicular to the longitudinal axis of the hole associated therewith. In other words, the micro-structures and the holes are manufactured with a precise fit, both in terms of their shape and dimensions as well as their number and distance from one another.

According to a first, preferred alternative of the method, the indicator unit is manufactured separately and subsequently joined to the decorative material. The production of the indicator unit comprises the following steps:
b1) providing a microLED display,
b2) providing or producing the micro-structures, wherein the number of micro-structures corresponds to the number of holes in the decorative material and/or wherein the micro-structures are dimensioned and/or spaced apart from one another in such a way that they can be inserted or introduced into the hole of the micro-perforation respectively associated therewith in the decorative material,
b3) placing or attaching or arranging the micro-structures on one of the microLEDs of the display.

The micro-structures are provided or produced, for example, by means of injection molding or hot stamping.

In particular, an end portion of the micro-structures facing the microLED is designed as a micro-lens or a micro-lens is arranged on an end portion of the micro-structures facing the microLED, wherein the placement or attachment or arrangement of the micro-structures takes place on one of the microLEDs via the micro-lens.

According to a further preferred embodiment, the micro-optical system or the micro-structures are generated or formed on the microLEDs. The production of the indicator unit comprises the following steps:
b1') providing a microLED display,
b2') forming the micro-structures on one of the microLEDs of the display, wherein the number of micro-structures corresponds to the number of holes in the decorative material and/or wherein the micro-structures are dimensioned and/or spaced apart from one another in such a way that they can be inserted or introduced into the hole of the micro-perforation respectively associated therewith in the decorative material.

In particular, an end portion of the micro-structures facing the microLED is designed as a micro-lens.

The production of the indicator unit can in each case comprise further steps, for example arranging, fastening and/or contacting the microLEDs on a printed circuit board.

The micro-optical system, in particular the micro-structures, are preferably produced from a plastics material or from a material comprising plastics material. Such a plastics material is in particular a translucent or transparent plastics material, for example PMMA or polycarbonate.

According to an advantageous embodiment variant, a carrier is attached or formed on the rear side of the decorative layer, wherein the carrier is applied or formed in such a way that it has a recess in a region of the holes, and the microLED display is arranged within the recess of the carrier during assembly. The carrier can be formed from a plastics material, for example polyurethane PUR and/or polycarbonate PC, or comprise the plastics material. Furthermore, it can be provided that the carrier is injection-molded onto the rear side of the decorative layer. Alternatively, the carrier can be bonded or pressed onto the rear side of the decorative layer, in particular by means of the adhesive ply (ies). The carrier can be formed or attached before or after the assembly of the decorative material and the indicator unit.

A protective and/or optical layer, for example an open-pored or high-gloss protective and/or optical layer, for example a transparent or translucent lacquer layer, can also be applied to the front of the decorative material or the decorative layer produced. The protective and/or optical layer can, for example, be cast and/or injected and/or sprayed on. For example, the protective and/or optical layer can be formed from polyurethane ("PUR") or a material comprising PUR.

BRIEF DESCRIPTION OF THE DRAWINGS

The invention is explained in more detail below also with regard to further features and advantages on the basis of the description of an exemplary embodiment and with reference to the accompanying schematic drawings. In the drawings.

DETAILED DESCRIPTION

Figure 1:
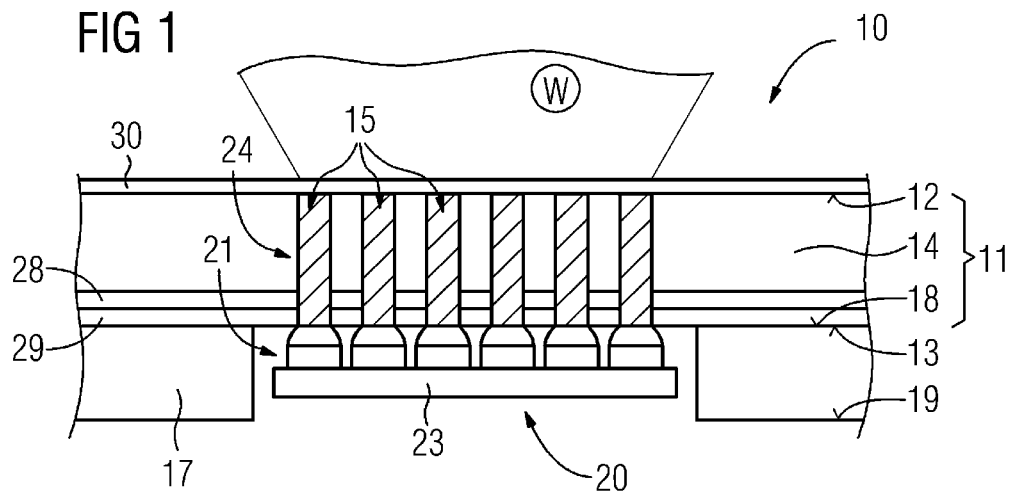
FIG. 1 shows a shaped part according to the invention according to an embodiment.

The shaped part 10 according to the invention (FIG. 1) comprises a decorative layer 11 having a front side 12 designed as a visible side and a rear side 13 opposite the front side 12. In the present case, the decorative layer 11 has a decorative ply 14, for example a wood veneer, which is designed to be at least largely opaque. The decorative layer 11 also has a micro-perforation 16 formed by a plurality of through holes 15, wherein the holes 15 each extend in a straight line along their respective longitudinal axis A between the rear side 13 and the front side 12 of the decorative layer 11. The longitudinal axis A runs parallel to a surface normal of the front side 12. In the present case, the holes 15 have a circular cross section—perpendicular to their longitudinal axis A—and run parallel to one another. A carrier 17 having a front side 18 facing the decorative layer 11 and a rear side 19 opposite the front side 18 is arranged on the rear side 13 of the decorative layer 11.

The shaped part 10 further comprises an indicator unit 20 having a display 21 arranged on the rear side 13 of the decorative layer 11 and having an optical system by means of which an indication shown by the display 21 is visible through the micro-perforation 16 of the decorative layer 11 on the visible side of the shaped part 10. The display 21 is a microLED display, the pixels of which are formed by microLEDs 22, wherein the microLEDs 22 are arranged, attached, and electrically contacted on a common printed circuit board 23. The optical system is a micro-optical system 24 having micro-structures 25 which serve as light guides. The micro-structures 25 are in particular made of a material comprising a transparent or translucent plastics material. Each of the micro-structures 25 extends from the rear side 13 of the decorative layer along the longitudinal axis A into a hole 15 associated therewith in the micro-perforation 16 in the decorative layer 11, in the present case both over the entire length of the hole 15 and in such a way that they completely fill the holes 15 in a transverse direction running perpendicular to the longitudinal axis A, i.e. the cross section of the holes 15 is completely filled. Each micro-structure 25 is associated with a microLED 22 and one of the holes 15. The micro-structures 25 are therefore arranged and designed in such a way that they guide the light emitted by the microLED 22 associated therewith through the hole 15 associated therewith to the front side 12 of the decorative layer.

In the present case, an end portion of each micro-structure 25 facing the microLED 22 is designed as a micro-lens 26 in order to concentrate light emitted by the microLED 22 and to guide it in a targeted manner into and through a rod-shaped portion of the micro-structures 25, which is arranged within the hole 15, and thus to the visible side of the shaped part 10. As a result, an indication originating from the display 21 is visible on the visible side of the shaped part 10 at an angular width W, which indication is displayed with excellent edge sharpness and luminance as well as unchanged color representation due to the efficient light guidance of the micro-structures 25.

In the present case, the indicator unit 20 is arranged in a recess 27 of the carrier 17 which is formed in a region of the micro-perforation 16 in the carrier 16.

The decorative layer 11 can consist only of the decorative ply 14 described above. In the present case, however, the decorative layer 11 comprises, in addition to the decorative ply 14, two further intermediate plies 28, 29 which are attached to a rear side of the decorative ply 14. In the present case, the intermediate plies 28, 29 are an adhesive layer 28 and a stabilizing layer 29, in this case a nonwoven, bonded to the decorative ply 14 by means of the adhesive layer 28. The holes 15 extend through the entire decorative layer 11 and thus through both the decorative ply 14 and the intermediate layers 28, 29.

A transparent or translucent protective and/or optical layer 30 made of lacquer is also provided on the front side 12 of the decorative layer 11.

Figure 2:
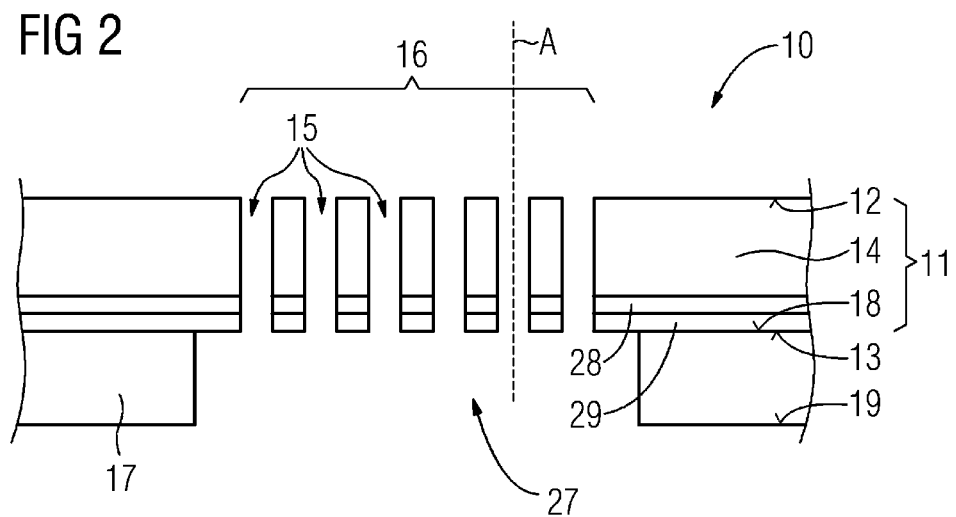
FIG. 2 shows a detail of an embodiment of a micro-perforated decorative material having a carrier in a schematic cross-sectional representation.

To produce a shaped part 10, a decorative material is first provided (step a) for forming a decorative layer 11 having a front side 12 designed as a visible side and a rear side 13 opposite the front side 12 (FIG. 2). The decorative material comprises, for example, a wood veneer for forming the decorative ply 14 and two further intermediate plies 28, 29, in this case an adhesive layer 28 and a stabilizing layer 29, in this case a nonwoven, bonded to the decorative ply 14 by means of the adhesive layer 28.

In a further step b), a plurality of through holes 15 are introduced into the decorative material or into a portion of the decorative layer 11 produced therefrom, for example six such holes 15 are shown which form a micro-perforation 16. This micro-perforation 16 is formed in the decorative layer 11, for example, by means of a laser. The holes 15 are introduced in such a way that they each extend in a straight line along their respective longitudinal axis A between the rear side 13 and the front side 12 of the decorative layer 11, and the longitudinal axis A runs parallel to a surface normal of the front side 12. In the present case, the holes 15 are also designed with a circular cross section—perpendicular to their longitudinal axis A—and running parallel to one another. The holes 15 are introduced through the entire decorative layer 11 and thus through both the decorative ply 14 and the intermediate layers 28, 29.

Furthermore, a carrier 17 is formed on the rear side 13 of the decorative layer 11, which carrier has a front side 18 facing the decorative layer 11 and a rear side 19 opposite the front side 18 and facing away from the decorative layer 11. The carrier 17 is formed, for example, by means of back-injection of the decorative material, in particular with a carrier material made of a plastics material or a material comprising a plastics material. The carrier 17 is designed in such a way that it has a recess 27 in a region of the holes 15. In other words, only the decorative layer 11 is present in a region of the micro-perforation 16. According to the embodiment, the carrier 13 is formed before the decorative material is assembled with the indicator unit 20. Alternatively, the carrier 13 can also be made after the decorative material has been assembled with the indicator unit 20, for example by bonding or pressing a carrier 17 onto the rear side 13 of the decorative layer 11.

Figure 3:
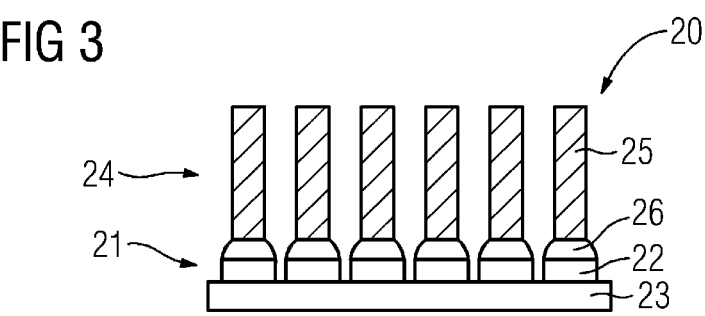
FIG. 3 shows an embodiment of an indicator unit in a schematic cross-sectional representation.

In a further step c)—successive or parallel to the provision of the micro-perforated decorative layer 11—an indicator unit 20 comprising a display 21, more precisely a microLED display, the pixels of which are formed by microLEDs 22 which are arranged, attached and electrically contacted on a common printed circuit board 23, and comprising an optical system, more precisely a micro-optical system 24 having micro-structures 25, is provided or produced (FIG. 3).

The indicator unit 20 can be produced in such a way that the micro-structures 25 are produced in a separate step and then applied to the microLEDs 22. In this case, a microLED display 21 is provided in a first step b1). In a further step b2), the micro-structures 25 are provided or produced. The micro-structures 25 are thereby manufactured with a precise fit with respect to the decorative layer 11, i.e. the number of micro-structures 25 corresponds to the number of holes 15 in the decorative material, and the micro-structures 25 are dimensioned and spaced apart from one another in such a way that they can be inserted or introduced into the hole 15 of the micro-perforation 16 respectively associated therewith in the decorative material. In a further step b3), the micro-structures 25 produced or provided are placed, attached or arranged on one of the microLEDs 22 of the display.

In the present case, an end portion of the micro-structures 25 facing the microLED 22 is designed as a micro-lens 26. Alternatively, a micro-lens 26 could be arranged on an end portion of the micro-structures 25 facing the microLED 22. The micro-structure 25 is subsequently placed, attached or arranged on a microLED 22 via the micro-lens 26.

Alternatively, the indicator unit can be produced in such a way that the micro-structures 25 are produced directly on the microLEDs. A microLED display 21 is again provided in a first step b1'). In a second step b2'), the micro-structures 25 are formed on one of the microLEDs 22 of the display 21, wherein the number of micro-structures 25 in turn corresponds to the number of holes 15 in the decorative material and the micro-structures 25 in turn are dimensioned and spaced apart from one another in such a way that they can be inserted or introduced into the hole 15 of the micro-perforation 16 respectively associated therewith in the decorative material.

An end portion of the micro-structures 25 facing the microLED 22 is in turn designed as a micro-lens 26 in order to concentrate the light emitted by the microLED 22 and to guide it in a targeted manner through the holes 15.

The micro-optical system 24, i.e. the micro-structures 25 and the micro-lens 26, are each produced from a material comprising a plastics material or from a plastics material.

In a final step d), the indicator unit 20 and the decorative material or the decorative layer 11, optionally with the carrier 17 arranged thereon, are assembled by inserting or introducing the micro-structures 25 into the holes 15 of the micro-perforation 16 from a rear side of the decorative material provided as the rear side 13 of the decorative layer 11. In this case, the micro-structures 25 are inserted or introduced into the holes 15 along the respective longitudinal axis A in such a way that each micro-structure 25 extends along the longitudinal axis A of the hole 15 associated therewith, starting from the rear side of the decorative material over the entire length of the hole 15 and into the hole, and/or that each micro-structure 25 completely fills the hole 15 associated therewith in a transverse direction running perpendicular to the longitudinal axis A of the hole 15 associated therewith. The display 21 is arranged in the recess 27 of the carrier 17 or a carrier 17 having a recess 27 is subsequently attached to the rear side of the decorative layer 11.

A transparent or translucent protective and/or optical layer 30 made of lacquer can subsequently be applied to the front side 12 of the decorative layer 11.

LIST OF REFERENCE SIGNS

10 Shaped part
11 Decorative layer
12 Front side of the decorative layer
13 Rear side of the decorative layer
14 Decorative ply
15 Hole
16 Micro-perforation
17 Carrier
18 Front side of the carrier
19 Rear side of the carrier
20 Indicator unit
21 Display
22 MicroLED
23 Printed circuit board
24 Micro-optical system
25 Micro-structure
26 Micro-lens
27 Recess
28 Stabilizing layer/Nonwoven
29 Adhesive layer
30 Protective and/or optical layer
A Longitudinal axis of a hole
W Angular width

We claim:
1. A shaped part comprising:
a decorative layer having a front side designed as a visible side, a rear side opposite the front side and a micro-perforation formed by a plurality of through holes, wherein the holes each extend in a straight line along their respective longitudinal axis (A) between the rear side and the front side of the decorative layer, and an indicator unit comprising a display arranged on the rear side of the decorative layer and an optical system by means of which an indication shown by the display is visible through the micro-perforation of the decorative layer on the visible side of the shaped part, wherein the display is a microLED display, the pixels of which are formed by microLEDs, wherein the optical system is a micro-optical system having micro-structures, wherein each micro-structure extends from the rear side of the decorative layer into a hole associated therewith in the micro-perforation in the decorative layer, and wherein each micro-structure is associated with a microLED and is arranged and designed such that it guides the light emanating from the microLED associated therewith through the hole associated therewith to the front side of the decorative layer.

2. The shaped part according to claim 1, wherein:
each micro-structure extends along the longitudinal axis (A) of the hole associated therewith, starting from the rear side of the decorative layer over the entire length of the hole and into the hole.

3. The shaped part according to claim 1, wherein:
each micro-structure completely fills the hole associated therewith in a transverse direction running perpendicular to the longitudinal axis (A) of the hole associated therewith.

4. The shaped part according to claim 1, wherein:
each of the micro-structures comprises a micro-lens which is formed or arranged on an end portion of the micro-structures facing the microLED, and via which the respective micro-structure is arranged on the microLED associated therewith or is placed or applied thereon.

5. The shaped part according to claim 1, wherein:
the micro-optical system is formed from a plastics material or comprises a plastics material.

6. The shaped part according to claim 1, wherein:
the indicator unit comprises a printed circuit board on which the microLEDs are arranged and/or fastened and/or electrically contacted.

7. The shaped part according to claim 1, wherein:
the shaped part comprises a carrier arranged on the rear side of the decorative layer, wherein the carrier has a recess in a region of the holes, in which recess the display is arranged.

8. A method for producing a shaped part, in particular a shaped part according to claim 1, wherein the method comprises the following steps:
a) providing a decorative material for forming the decorative layer,
b) introducing a plurality of through holes into the decorative material for forming a micro-perforation,
c) providing and/or producing an indicator unit comprising a display, wherein the display is a microLED display, the pixels of which are formed by microLEDs, and comprising an optical system, wherein the optical system is a micro-optical system having micro-structures,
d) assembling the indicator unit and decorative material by inserting or introducing the micro-structures into the holes of the micro-perforation from a rear side of the decorative material provided as a rear side of the decorative layer, and arranging the display on the rear side of the decorative material.

9. The method according to claim 8, wherein:
the micro-structures are inserted or introduced into the holes along the respective longitudinal axis (A) in such a way that:
each micro-structure extends along the longitudinal axis (A) of the hole associated therewith, starting from the rear side of the decorative material over the entire length of the hole and into the hole, and/or
each micro-structure completely fills the hole associated therewith in a transverse direction running perpendicular to the longitudinal axis (A) of the hole associated therewith.

10. The method according to claim 8, wherein:
the production of the indicator unit comprises the following steps:
b1) providing a microLED display,
b2) providing or producing the micro-structures, wherein:
the number of micro-structures corresponds to the number of holes in the decorative material, and/or
the micro-structures are dimensioned and/or spaced apart from one another in such a way that they can be inserted or introduced into the hole of the micro-perforation respectively associated therewith in the decorative material,
b3) placing or attaching or arranging the micro-structures on one of the microLEDs of the display.

11. The method according to claim 10, wherein:
(i) an end portion of the micro-structures facing the microLED is designed as a micro-lens, or (ii) a micro-lens is arranged on an end portion of the micro-structures facing the microLED, and
the micro-structures are placed on or attached to or arranged on one of the microLEDs via the micro-lens.

12. The method according to claim 8, wherein:
the production of the indicator unit comprises the following steps:
b1') providing a microLED display,
b2') forming the micro-structures on one of the microLEDs of the display, wherein:
the number of micro-structures corresponds to the number of holes in the decorative material, and/or
the micro-structures are dimensioned and/or spaced apart from one another in such a way that they can be inserted or introduced into the hole of the micro-perforation respectively associated therewith in the decorative material.

13. The method according to claim 12, wherein:
an end portion of the micro-structures facing the microLED is designed as a micro-lens.

14. The method according to claim 8, wherein:
the micro-optical system is produced from a plastics material or a material comprising a plastics material.

15. The method according to claim 8, wherein:
a carrier is attached to or formed on the rear side of the decorative layer,
the carrier is attached or formed in such a way that:
it has a recess in a region of the holes, and
the microLED display is arranged within the recess of the carrier.

* * * * *